United States Patent [19]

Cheng

[11] Patent Number: 5,457,479
[45] Date of Patent: Oct. 10, 1995

[54] APPARATUS HAVING DUAL MODES FOR CONTROLLING CURSOR ON DISPLAY SCREEN

[75] Inventor: Vincent Cheng, Hsi Chih, Taiwan

[73] Assignee: Primax Electronics Ltd., Taipei, Taiwan

[21] Appl. No.: 258,965

[22] Filed: Jun. 13, 1994

[51] Int. Cl.⁶ ..................................................... G09G 3/02
[52] U.S. Cl. .................... 345/163; 345/167; 74/471 XY
[58] Field of Search .................................... 345/156, 157, 345/163, 164, 167; 74/471 XY; 273/148 B

[56] References Cited

U.S. PATENT DOCUMENTS

| | | | |
|---|---|---|---|
| 4,562,347 | 12/1985 | Hovey et al. | 345/167 |
| 4,786,892 | 11/1988 | Kubo et al. | 345/163 |
| 4,939,508 | 7/1990 | Lawrence et al. | 345/163 |
| 5,063,289 | 11/1991 | Jasinski et al. | 345/163 |
| 5,171,978 | 12/1992 | Mimlitch et al. | 345/163 |
| 5,280,276 | 1/1994 | Kwok | 345/163 |
| 5,287,090 | 2/1994 | Grant | 345/163 |
| 5,291,213 | 3/1994 | Krauss | 345/179 |
| 5,298,919 | 3/1994 | Chang | 345/163 |

FOREIGN PATENT DOCUMENTS

| | | | |
|---|---|---|---|
| 1-94422 | 4/1994 | Japan | 345/163 |
| 81205278 | 4/1981 | United Kingdom . | |

Primary Examiner—Ulysses Weldon
Assistant Examiner—Matthew Luu
Attorney, Agent, or Firm—Christie, Parker & Hale

[57] ABSTRACT

An apparatus having dual modes and adapted to control a position of a cursor on a display screen comprises a ball capable of being put in a rotation for determining the position, a roller device in contact with the ball to detect the rotation of the ball, a shell having thereon an opening to protrude therefrom the ball and accommodating therein the ball and the roller device, and a cover mounted on and connected to the shell, extractable therefrom to shield the ball from being inadvertently contacted, and retractable to be received therein to permit the apparatus to be normally used. This invention provides a simple apparatus capable of functioning as either a track ball or a mouse used for controlling a cursor on a display screen, e.g. a monitor.

19 Claims, 9 Drawing Sheets

APPARATUS HAVING DUAL MODES FOR CONTROLLING CURSOR ON DISPLAY SCREEN

FIELD OF THE INVENTION

This invention relates generally to an apparatus for controlling a cursor on a display screen, more particularly to an apparatus having dual modes for controlling a cursor on a display screen, and more specifically to an apparatus capable of functioning as either a track ball or a mouse.

BACKGROUND OF THE INVENTION

Both the track ball and the mouse are popular peripheral devices of great importance to a computer. Especially, nowadays when the softwares such as WINDOWS and AUTO CAD are being widely-used, they are highly qualified for controlling a movement of a cursor shown on a monitor. However, there still exist individual limitations. It is necessary to prepare a larger space for operating the mouse on a flat surface. However, although a smaller space is required for operating the track ball, the moving speed of the cursor on the monitor will be slower and the user's fingers will easily get tired after a long operation time. Therefore, an individual apparatus combining therein a track ball and a mouse is accordingly developed.

Figure 1:
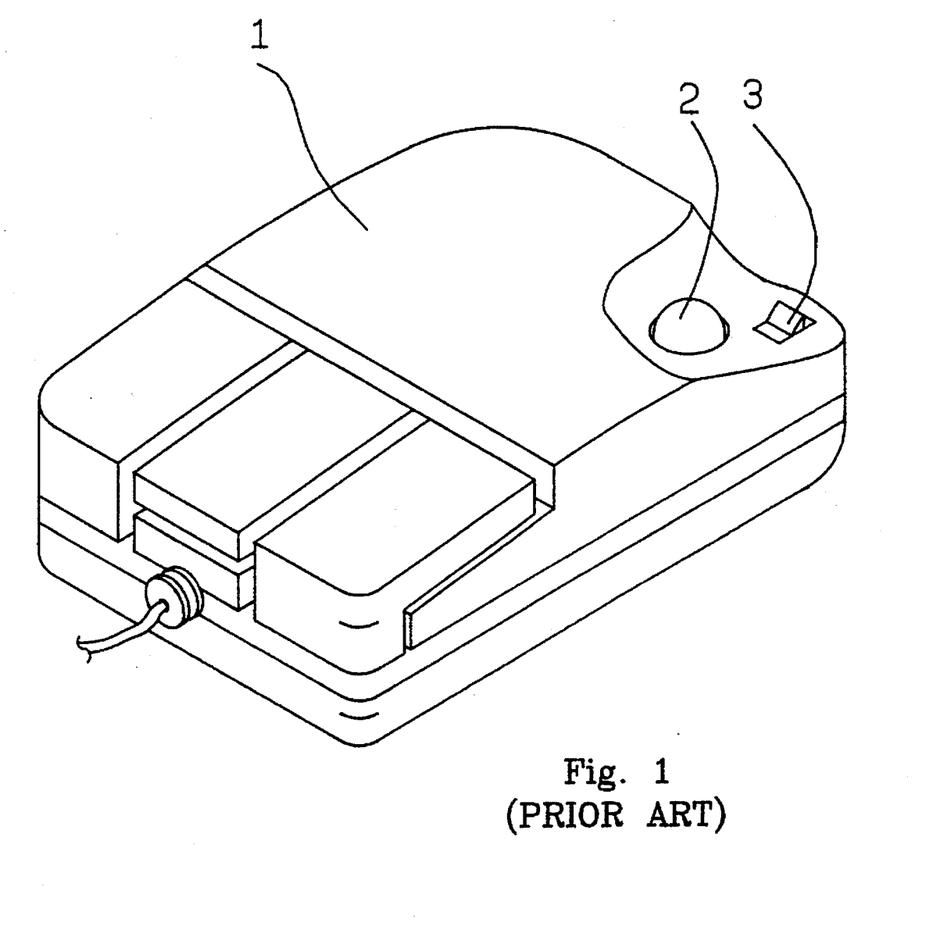
FIG. 1 is schematic view of a prior apparatus.
Figure 2A:
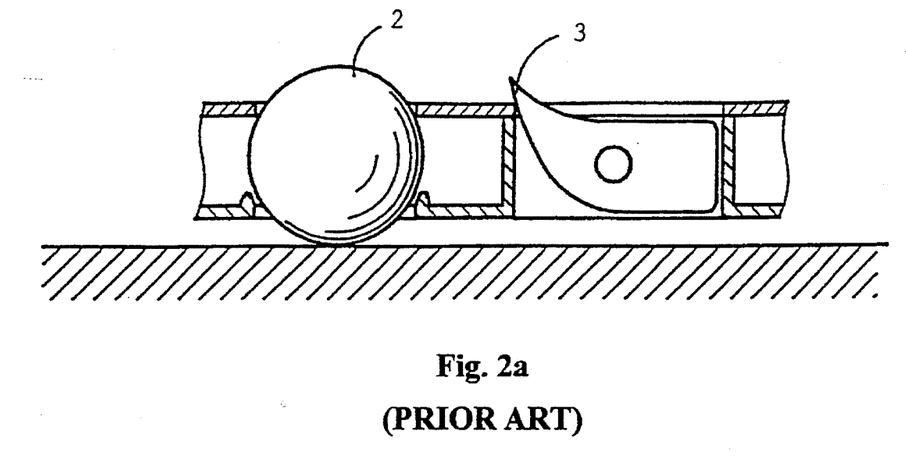
FIGS. 2a and 2b are schematic side views showing how a standing set of a prior apparatus works.
Figure 2B:
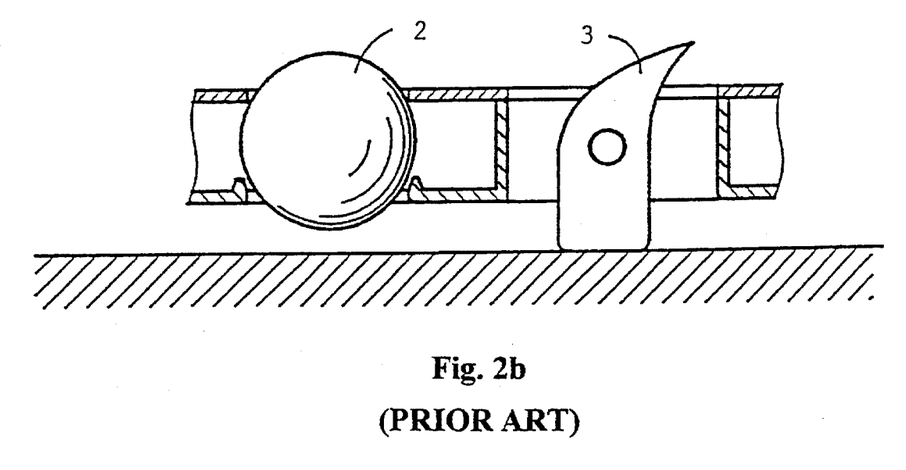
Figure 3:
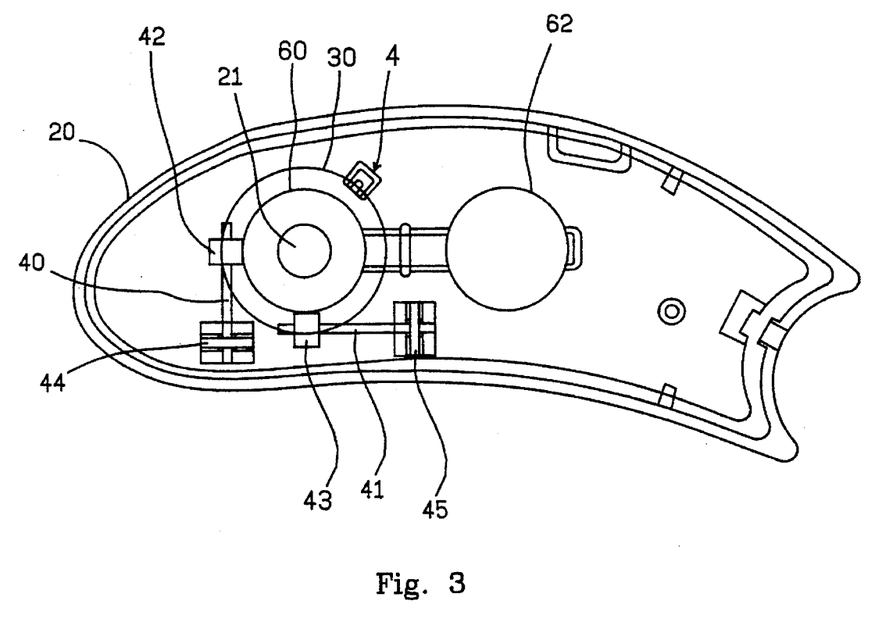
FIG. 3 is a schematic top view of a preferred embodiment of an apparatus according to this invention.
Figure 4:
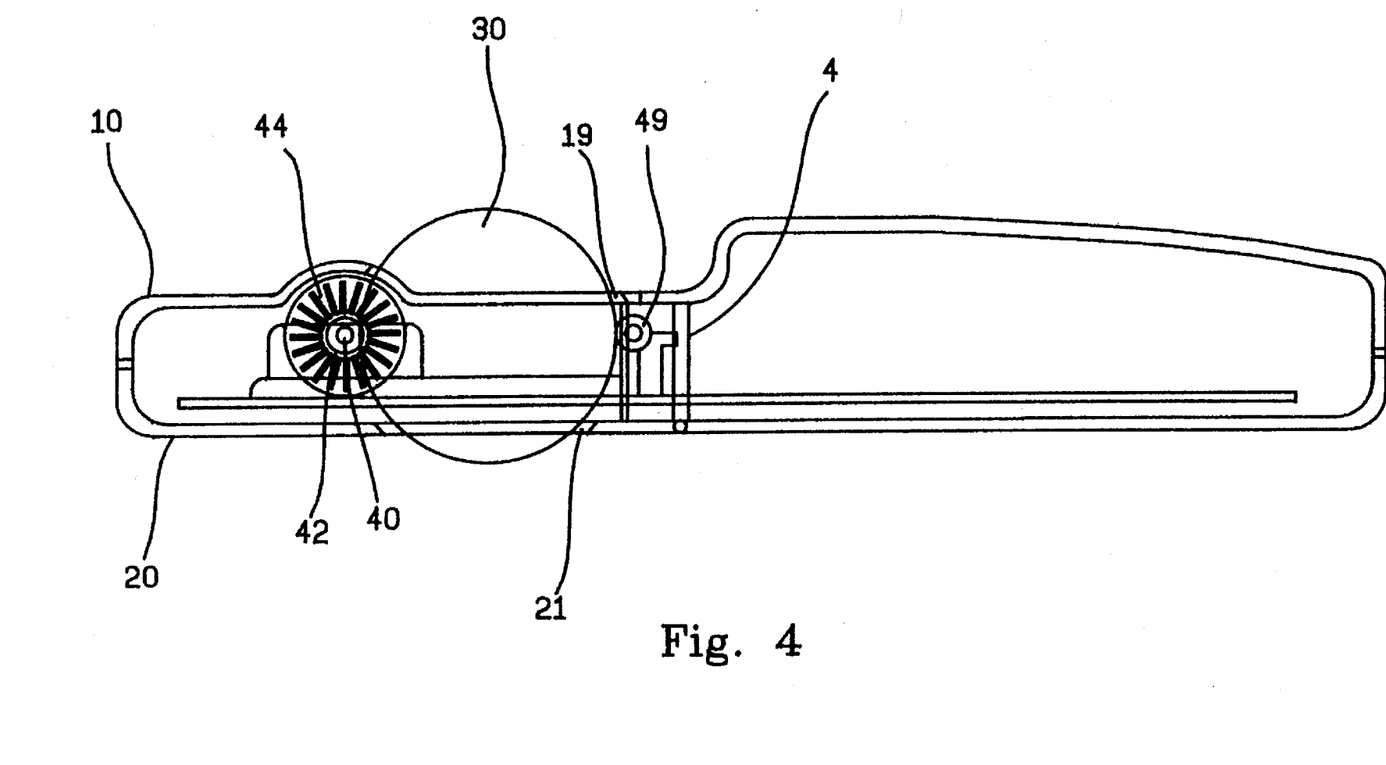
FIG. 4 is a schematic side view of a preferred embodiment of an apparatus according to this invention.
Figure 5:
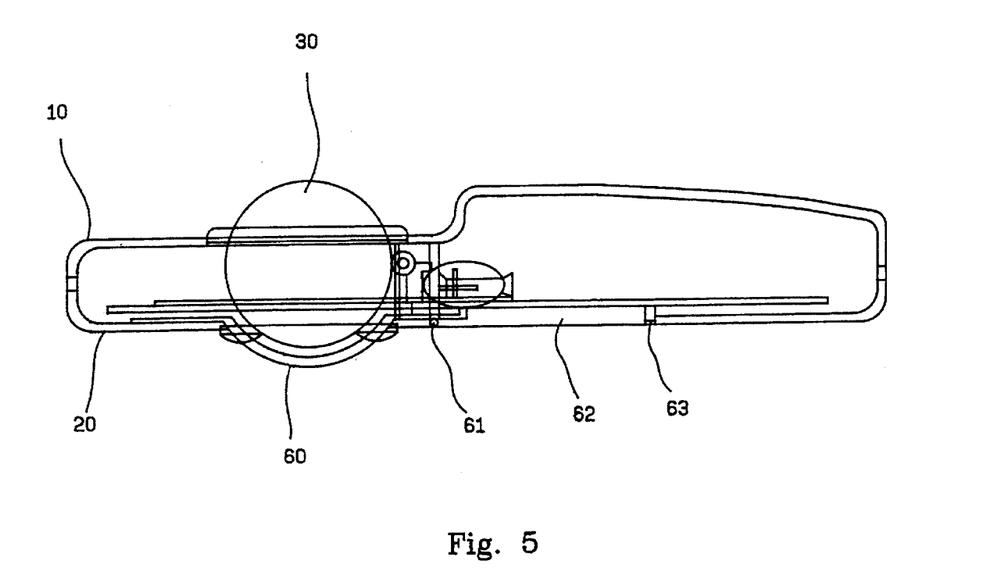
FIG. 5 is another schematic side view of a preferred embodiment of an apparatus according to this invention.
Figure 6:
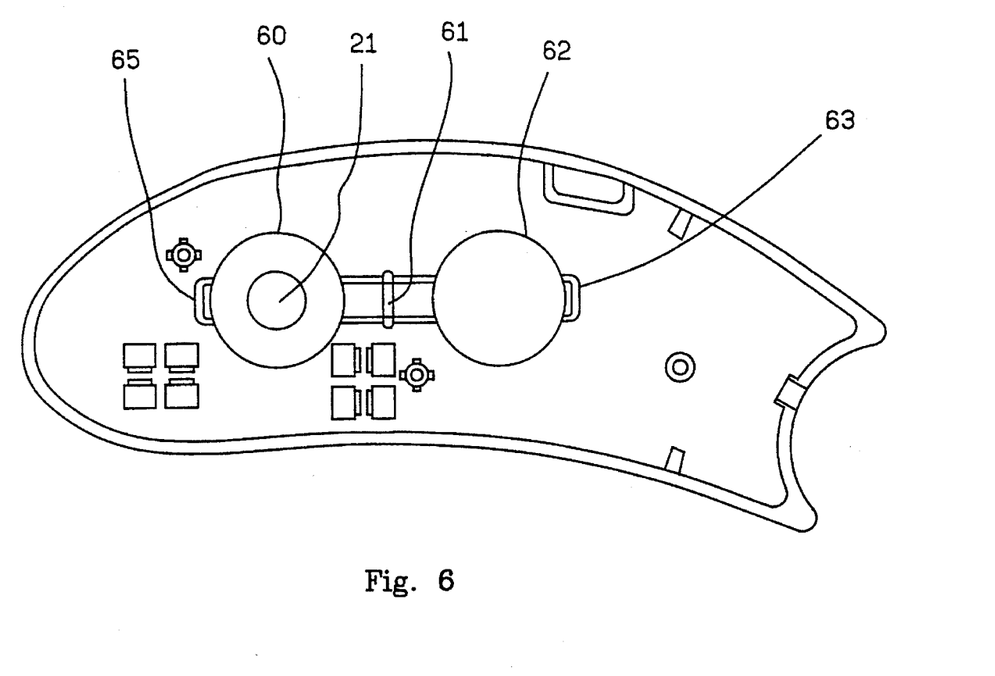
FIG. 6 is a simplified schematic top view of a preferred embodiment of an apparatus according to this invention.

A prior apparatus combining therein a track ball and a mouse, as disclosed in Taiwan, R.O.C. Patent Application No. 81,205,278 issued to Sysgration Ltd., comprises a shell 1, a ball 2 protruding through the shell 1, and a standing set 3 installed at the bottom of the shell 1, as shown in FIG. 1. The standing set 3 is similar to the one installed at the bottom of a computer keyboard for obtaining therefore an angle, e.g. 15°, between the keyboard surface and the desk surface. If the standing set 3 is flush with the bottom of the shell 1, the ball 2 can contact a flat surface such as a mouse pad so that the apparatus can function as a mouse, as shown in FIG. 2a. Otherwise, if the standing set 3 is turned to have an angle, e.g. 90°, with the bottom of the shell 1 to lift off the bottom of the shell 1 and the ball 2 from contacting a flat surface such as a desk surface, the apparatus can function as a track ball, as shown in FIG. 2b.

Even if the prior apparatus can function as both a track ball and a mouse, however, when the apparatus is used as a track ball, the standing set is easily unintentionally pressed back to its normal position to be flush with the bottom of the shell so that the lower part of the ball will contact the desk and the apparatus cannot function well as a track ball. In addition, the lower part of the ball protrudes and is exposed to the outside. Under this situation, if a user prefers holding this apparatus in one hand and rotates the ball with another hand, then the hand holding the apparatus will easily touch the ball which will adversely affect the rotation of the ball.

Furthermore, the ball of the prior apparatus, if the apparatus is used as a mouse, will be pushed upward so that the ball will be in a poor contact with the rollers. Although the prior apparatus further includes two magnetic pieces respectively installed beside two axial rods thereof so that two rollers provided on the axial rods can be attracted and pulled toward the ball, the problem of poor contact between the ball and the rollers is still unsolved.

SUMMARY OF THE INVENTION

An object of the present invention is to provide an apparatus having dual modes of a track ball and a mouse such that the ball cannot possible contact desk surface during the usage of the track ball mode.

Another object of the present invention is to provide an apparatus having dual modes of a track ball and a mouse, capable of being easily operated.

Another object of the present invention is to provide an apparatus having dual modes of a track ball and a mouse which ensures the roller device has a good detection of the rotation of the ball.

In accordance with the present invention, an apparatus having dual modes and adapted to control a position of a cursor on a display screen comprises a ball capable of being rotated in order to determine the position, a roller device in contact with the ball to detect the rotation of the ball, a shell having thereon an opening to protrude therefrom the ball and accommodating therein the ball and the roller device, a cover mounted on and connected to the shell, extractable therefrom to shield the ball from being inadvertently contacted, and retractable to be received therein to permit the apparatus to be normally used, a retainer for retaining the cover to the shell, a room for accommodating therein the cover, a supporting device provided around the opening of the shell for supporting the ball against the roller device to keep a perfect contact between the ball and the roller device, and a pushing device for pushing the ball against the roller device.

In accordance with another aspect of the present invention, the cover is pivotally mounted on and connected to the shell by a pin.

In accordance with another aspect of the present invention, the retainer includes a scarf and a latch, one of which is provided on one of the cover and the shell, and the other one of which is provided on the other one of the cover and the shell.

In accordance with another aspect of the present invention, the retainer allows the cover be extracted from the room to shield the ball from being inadvertently contacted so that the apparatus can function as a track ball, or the cover is retracted into the room in order that the apparatus can function as a mouse.

In accordance with another aspect of the present invention, the shell further includes a second opening and the ball respectively through the openings protrudes from a bottom and a top surfaces of the shell.

In accordance with another aspect of the present invention, the cover is mounted on the bottom surface.

In accordance with another aspect of the present invention, the roller device includes an X-roller and a Y-roller.

In accordance with another aspect of the present invention, the supporting device further includes a rolling pellet installed on a top of the supporting device for ensuring the rotation of the ball.

In accordance with another aspect of the present invention, the supporting device includes plural supporting pieces uniformly allocated around the opening of the shell, and preferably includes three of the same.

In accordance with another aspect of the present invention, the pushing device further includes a rolling pellet to ensure the rotation of the ball.

In accordance with another aspect of the present invention, the pushing device further includes a connecting piece installed with an elastic piece, e.g. a spring or a flexible metal piece, and connected to the rolling pellet of the pushing device to urge the rolling pellet of the pushing device against the ball.

The present invention may be best understood through the following description with reference to the accompanying drawings, in which:

DETAILED DESCRIPTION OF THE PREFERRED EMBODIMENT

A preferred apparatus having dual modes of a track ball and a mouse of this invention, as shown in FIGS. 3, 4, 5, 6, 7 and 8, includes a ball 30, an X-roller 42 and a Y-roller 43 respectively contacting the ball 30 to detect the rotation of the ball 30, an X-gridwheel 44 and a Y-gridwheel 45 respectively coaxially installed on an X-axial rod 40 and a Y-axial rod 41 respectively with the X- and Y-rollers 42 and 43, a pushing device 4 for pushing the ball 30 against the X- and Y- rollers 42 and 43 to ensure a good contact between the ball 30 and the rollers 42 and 43, a circuit being capable of detecting rotation movements of X- and Y-gridwheels 44 and 45 so as to give a signal to the computer for moving a cursor shown on a monitor, a top and a bottom shells 10 and 20 for accommodating the above-mentioned devices or elements and allowing the ball 30 to protrude, respectively, through openings 19 and 21 of the top and bottom shells 10 and 20, and a cover 60 mounted on and connected to the bottom shell 20, extractable therefrom to shield the ball 30 from being inadvertently contacted, and retractable to be received in a receptacle area, termed herein a room, 62 on the bottom shell 20 to permit the apparatus to be normally used. The cover 60 is pivotally mounted on and connected to the bottom shell 20 by a pin 61, and has a retainer, e.g. a latch 64, for retaining the cover to the bottom shell 20 via another retainer, e.g. a scarf 63 or 65, on the bottom shell 20.

Figure 7:
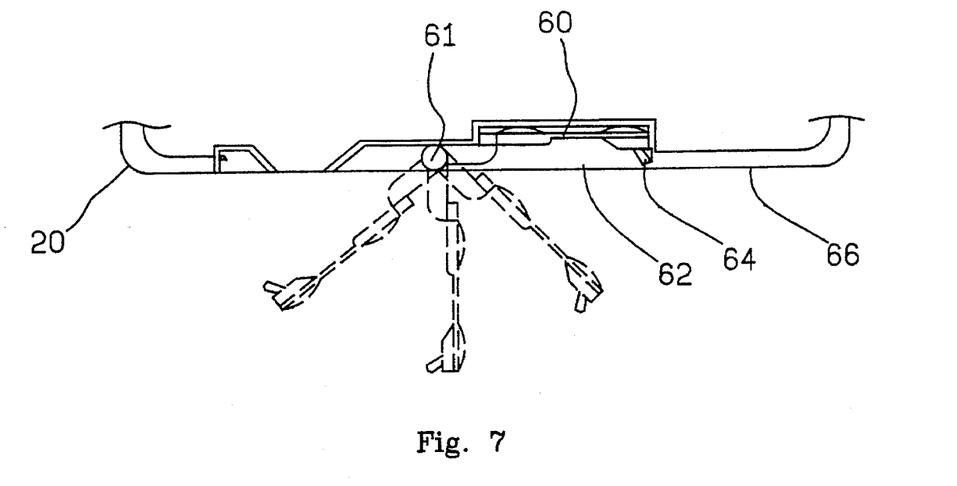
FIG. 7 is a simplified schematic side view showing various positions of a cover of a preferred embodiment of an apparatus according to this invention.
Figure 8:
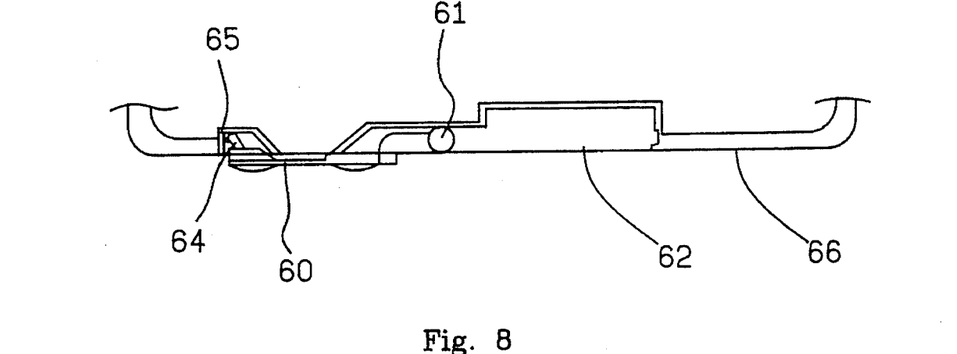
FIG. 8 is a simplified schematic side view showing another position of a cover of a preferred embodiment according to this invention.

The top shell 10 can have a smoothly curved appearance for a user to easily handle and operate the apparatus and can be fitted with the bottom shell 20 which has a flat bottom surface 66 capable of being stably placed on a flat surface such as a desk surface or a mouse pad. When the cover 60 is retracted to be received in the room 62, as shown in FIG. 7, the cover 60 is flush with the bottom surface 66 of the bottom shell 20 to keep the bottom of the bottom shell 20 substantially flat so that the apparatus can perfectly function as a mouse. When the cover 60 is extracted to shield the ball 30, as shown in FIG. 8, the ball cannot be inadvertently contacted so that the apparatus can effectively function as a track ball. Of course, the cover 60 can be installed on and connected to the top shell 10 by a similar mechanism to prevent the ball 30 from any inadvertent contact from the top when the apparatus is operated as a mouse.

Figure 9:
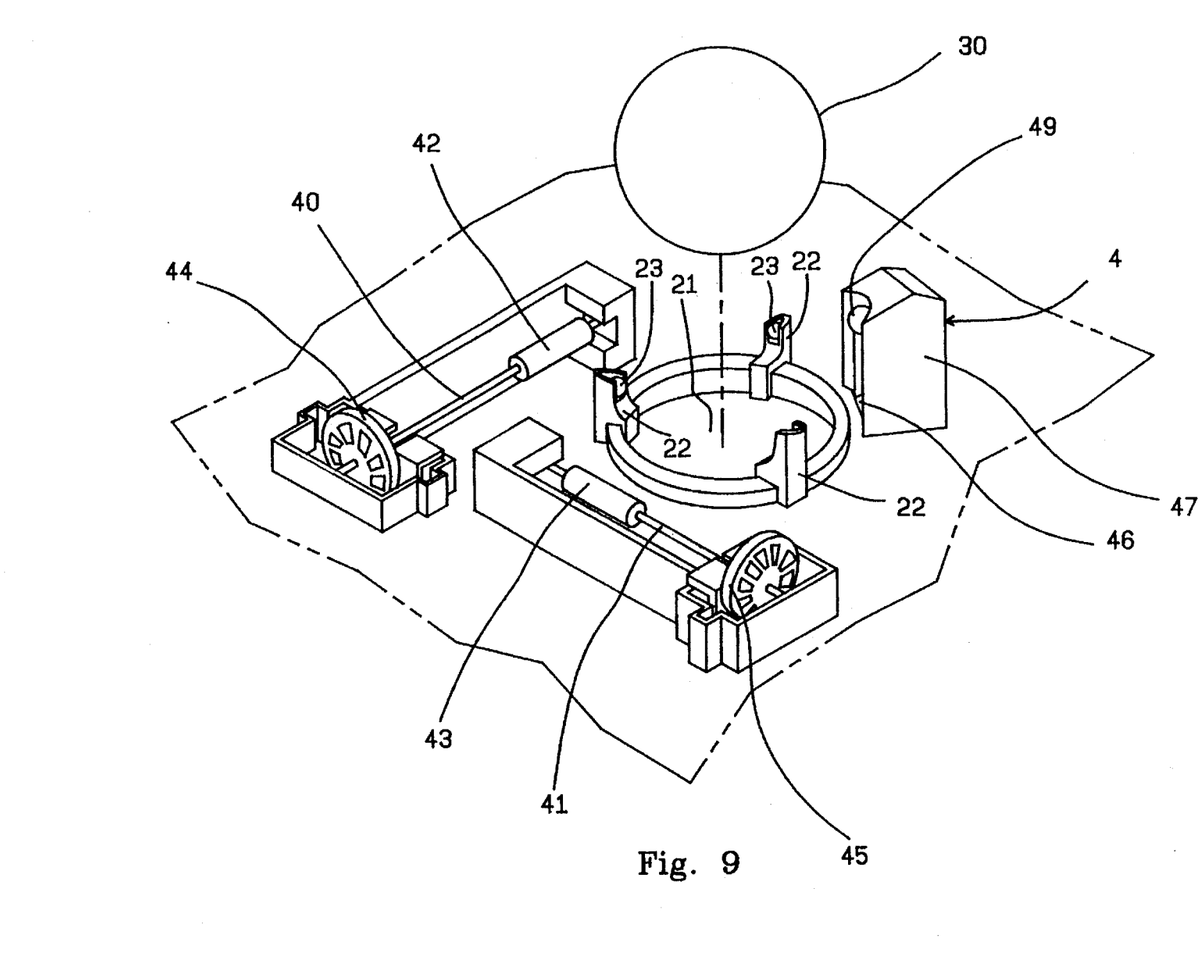
FIG. 9 is a partly schematic exploded view of a preferred embodiment of an apparatus according to this invention.
Figure 10:
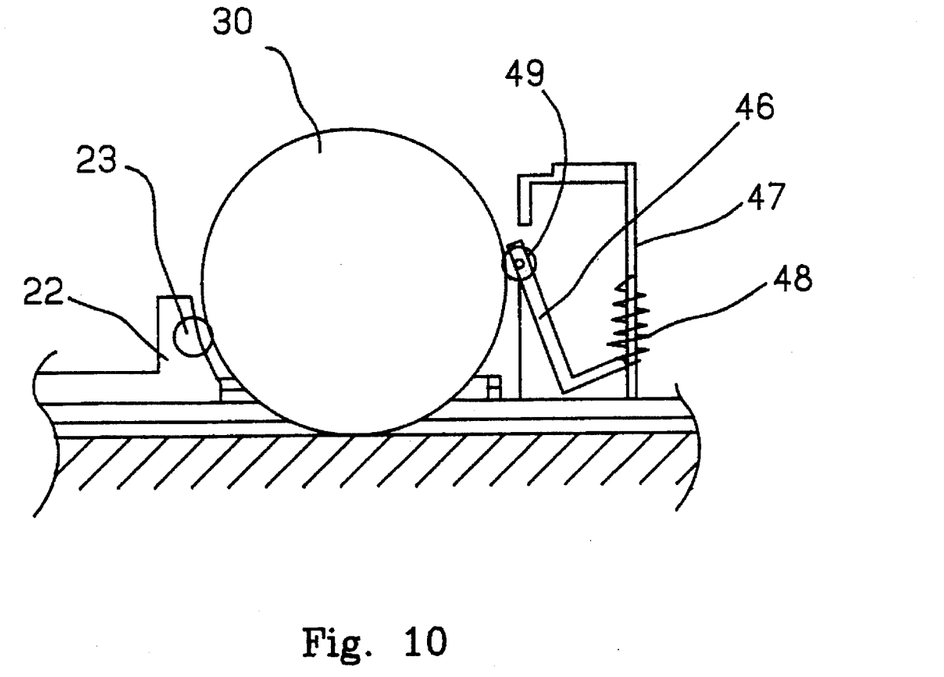
FIG. 10 is a schematic side view showing how a pushing device of a preferred embodiment of an apparatus according to this invention works.

This apparatus can further include a supporting device to support the ball 30 against the gravitational force. The supporting device of a preferred embodiment of an apparatus of this invention includes three supporting pieces 22 uniformly allocated around the opening 21 of the bottom shell 20, as shown in FIGS. 9 and 10. There can exist three rolling pellets 23 respectively installed on three supporting pieces 22 for ensuring the positive rotation of the ball 30. When the apparatus is operated as a track ball, the three supporting pieces 22 provide a resultant force exerted to the ball 30 against the force exerted by a finger of a user to the ball 30.

As also shown in FIGS. 9 and 10, the pushing device 4, which is located at a position capable of providing a force exerted to the ball 30 against a resultant force of two forces exerted respectively by the X- and Y-rollers 42 and 43 to the ball 30, includes a fixed frame 47, a connecting piece 46 installed through a spring 48 at one end on the fixed frame 47 and having a rolling pellet 49 on the other end to urge the ball against the rollers 42 and 43 and keep a good contact with the ball 30. When the apparatus is operated as a mouse, the ball 30 will tend to be pushed upward. Therefore, the pushing device 4 is capable of effectively urging the ball 30 toward the X- and Y-rollers 42 and 43.

It can be concluded that, although the apparatus according to this invention has a similar basic function as the prior one does, this invention has significant improvements in structure, in usage, and in humanity. It is easily changeable from one mode to the other by merely extracting or retracting the cover 60 from the bottom shell 20 and any inadvertent contact to the ball 30 is also successfully avoided. The apparatus according to this invention is indeed satisfied for operation under various situations while the users have their own special operating habits, requirements, and environments.

It is to be noted that the above descriptions including preferred embodiments of this invention are presented herein for purpose of illustration and description only; it is not intended to be exhaustive or to be limited to the precise form disclosed.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An apparatus having dual modes adapted to control the position of a cursor on a display screen comprising:

a ball capable of being rotated to determine said cursor position;

a roller device in contact with said ball to detect said rotation of said ball;

a shell having thereon a first opening through which said ball protrudes, the shell adapted to accommodate therein said ball and said roller device, the shell including a room; and     a cover connected to said shell and disposed in said room, the cover extractable from said room to shield said ball from being inadvertently contacted, the cover retractable into said room to permit said ball to be contacted and used.

2. An apparatus as claimed in claim 1, wherein said cover is pivotally connected to said shell by a pin.

3. An apparatus as claimed in claim 1, further comprising a retainer for retaining said cover to said shell.

4. An apparatus as claimed in claim 3, wherein said retainer includes a scarf provided on said cover and a latch provided on said shell.

5. An apparatus as claimed in claim 4, wherein said retainer allows said cover to be extracted from said room to shield said ball from being inadvertently contacted.

6. An apparatus as claimed in claim 5, wherein said apparatus functions as a track ball.

7. An apparatus as claimed in claim 4, wherein said cover is retracted into said room in order that said apparatus can function as a mouse.

8. An apparatus as claimed in claim 1, wherein said shell further includes a second opening and said ball respectively through said openings protrudes from a bottom and a top surfaces of said shell.

9. An apparatus as claimed in claim 8, wherein said cover is mounted on said bottom surface.

10. An apparatus as claimed in claim 1, wherein said roller device includes an X-roller and a Y-roller.

11. An apparatus as claimed in claim 1, further including a supporting device provided around said first opening of said shell for supporting said ball against said roller device to keep a perfect contact between said ball and said roller device.

12. An apparatus as claimed in claim 11, wherein said supporting device further includes a rolling pellet installed on a top of said supporting device for ensuring said rotation of said ball.

13. An apparatus as claimed in claim 11, wherein said supporting device includes plural supporting pieces uniformly allocated around said first opening of said shell.

14. An apparatus as claimed in claim 13, wherein said plural supporting pieces include three same ones.

15. An apparatus as claimed in claim 1, further including a pushing device for pushing said ball against said roller device.

16. An apparatus as claimed in claim 15, wherein said pushing device further includes a rolling pellet to ensure said rotation of said ball.

17. An apparatus as claimed in claim 16 wherein said pushing device further includes a connecting piece installed with an elastic piece and connected to said rolling pellet of said pushing device for allowing said rolling pellet of said pushing device to usually urge against said ball.

18. An apparatus as claimed in claim 17, wherein said elastic piece is one selected from a group consisting of a spring and a flexible metal piece.

19. An apparatus as claimed in claim 3, wherein said retainer includes a latch provided on said cover and a scarf provided on said shell.

* * * * *